US012638406B2

(12) United States Patent (10) Patent No.: US 12,638,406 B2
Fukuchi (45) Date of Patent: May 26, 2026

(54) WIRING COMPONENT WITH PHYSICAL QUANTITY SENSOR

(71) Applicant: Hitachi Metals, Ltd., Tokyo (JP)

(72) Inventor: Keisuke Fukuchi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 532 days.

(21) Appl. No.: 17/856,427

(22) Filed: Jul. 1, 2022

(65) Prior Publication Data

US 2023/0009239 A1 Jan. 12, 2023

(30) Foreign Application Priority Data

Jul. 6, 2021 (JP) .................................. 2021-112334

(51) Int. Cl.
*G01N 25/72* (2006.01)
(52) U.S. Cl.
CPC .................................... *G01N 25/72* (2013.01)
(58) Field of Classification Search
CPC ........... G01N 25/72; G01K 1/14; H02K 11/25
See application file for complete search history.

(56) References Cited

U.S. PATENT DOCUMENTS

| | | | | |
|---|---|---|---|---|
| 10,768,054 B2 * | 9/2020 | Lyon | ...................... | H01R 13/111 |
| 10,935,434 B2 | 3/2021 | Yoshihara et al. | | |
| 2013/0270973 A1 | 10/2013 | Ikemoto | | |
| 2019/0265108 A1 | 8/2019 | Yoshihara et al. | | |
| 2020/0370679 A1 * | 11/2020 | Crozier | ................ | F16L 3/1066 |
| 2020/0393306 A1 * | 12/2020 | Yoshihara | ................ | G01K 1/14 |
| 2021/0148766 A1 | 5/2021 | Takase et al. | | |

FOREIGN PATENT DOCUMENTS

| | | | | | |
|---|---|---|---|---|---|
| JP | 2507775 | Y2 | 8/1996 | | |
| JP | 5621810 | B2 | 10/2014 | | |
| JP | 6297765 | B1 | 3/2018 | | |
| JP | 2018-186608 | A | 11/2018 | | |
| JP | 2019-074326 | A | 5/2019 | | |
| WO | WO-2016120929 | A1 * | 8/2016 | ............... | G01K 1/14 |
| WO | 2020/175349 | A1 | 9/2020 | | |

OTHER PUBLICATIONS

An Office Action mailed by the Japanese Patent Office on Aug. 13, 2024, which corresponds to Japanese Patent Application No. 2021-112334 and is related to U.S. Appl. No. 17/856,427; with English language translation.
An Office Action; "Notice of Reasons for Refusal," mailed by the Japanese Patent Office on Jun. 17, 2025, which corresponds to Japanese Patent Application No. 2024-146131 and is related to U.S. Appl. No. 17/856,427; with English language translation.

* cited by examiner

*Primary Examiner* — Laura Martin
*Assistant Examiner* — Julia Fitzpatrick
(74) *Attorney, Agent, or Firm* — Studebaker Brackett PLLC

(57) ABSTRACT

A wiring component with physical quantity sensor is provided with an electric wire, a physical quantity sensor to detect a physical quantity of the electric wire, a holding member that is composed of a molded body covering a portion in a longitudinal direction of the electric wire and has a holding hole to house the physical quantity sensor, and an attachment member attached to the holding member. The physical quantity sensor is prevented from coming out of the holding hole by the attachment member.

15 Claims, 17 Drawing Sheets

WIRING COMPONENT WITH PHYSICAL QUANTITY SENSOR

CROSS-REFERENCE TO RELATED APPLICATION

The present patent application claims the priority of Japanese patent application. No. 2021-112334 filed on Jul. 6, 2021, and the entire contents of Japanese patent application No. 2021-112334 are hereby incorporated by reference.

TECHNICAL FIELD

The present invention relates to a wiring component with physical quantity sensor that detects a physical quantity of an electric wire.

BACKGROUND ART

Conventionally, temperature of, e.g., an electric wire of a stator winding carrying an excitation current in a motor is detected by a temperature sensor to suppress occurrence of damage, etc., caused by overheating of the stator winding. The electric wire, which is subjected to detection, generates heat due to Joule heating (copper loss) caused by a current flowing therethrough and its temperature rises also due to heat transfer from the motor.

Patent Literature 1 discloses a rotating electrical machine in which a neutral wire of a three-phase motor is bent into a U-shape outside a stator core and a temperature sensor is arranged on the arc-shaped portion at the bottom of the U-shape. The temperature sensor, together with the U-shaped bend of the neutral wire, is embedded in a molded body made of resin. The molded body is formed by insert molding, in which a mold is arranged so as to surround the temperature sensor and the U-shaped portion of the neutral wire and a molten resin in the form of liquid is injected into the mold and cured.

CITATION LIST

Patent Literature

Patent Literature 1: Japanese Patent No. 5621810

SUMMARY OF INVENTION

In the case of Patent Literature 1, the temperature sensor is exposed to heat of the molten resin at the time of insert molding, hence, temperature detection accuracy, etc., may be adversely affected if the temperature sensor is damaged by this heat. Meanwhile, a temperature sensor with high heat resistance, if used, leads to an increase in cost.

Therefore, it is an object of the invention to provide a wiring component with physical quantity sensor, in which a physical quantity sensor is held by a molded body covering a portion in a longitudinal direction of an electric wire to be detected (i.e., detection target electric wire) but damage on the physical quantity sensor by heat at the time of molding the molded body can be suppressed.

So as to achieve the above object, one aspect of the present invention provides a wiring component with physical quantity sensor, comprising:

an electric wire;

a physical quantity sensor to detect a physical quantity of the electric wire;

a holding member that comprises a molded body covering a portion in a longitudinal direction of the electric wire and has a holding hole to house the physical quantity sensor; and an attachment member attached to the holding member, wherein the physical quantity sensor is prevented from coming out of the holding hole by the attachment member.

Effects of the Invention

According to a wiring component with physical quantity sensor of the present invention, it is possible to suppress the damage on the physical quantity sensor by heat at the time of molding the molded body.

DESCRIPTION OF EMBODIMENTS

First Embodiment

The first embodiment of the invention will be described in reference to FIGS. 1 to 6.

Figure 1:
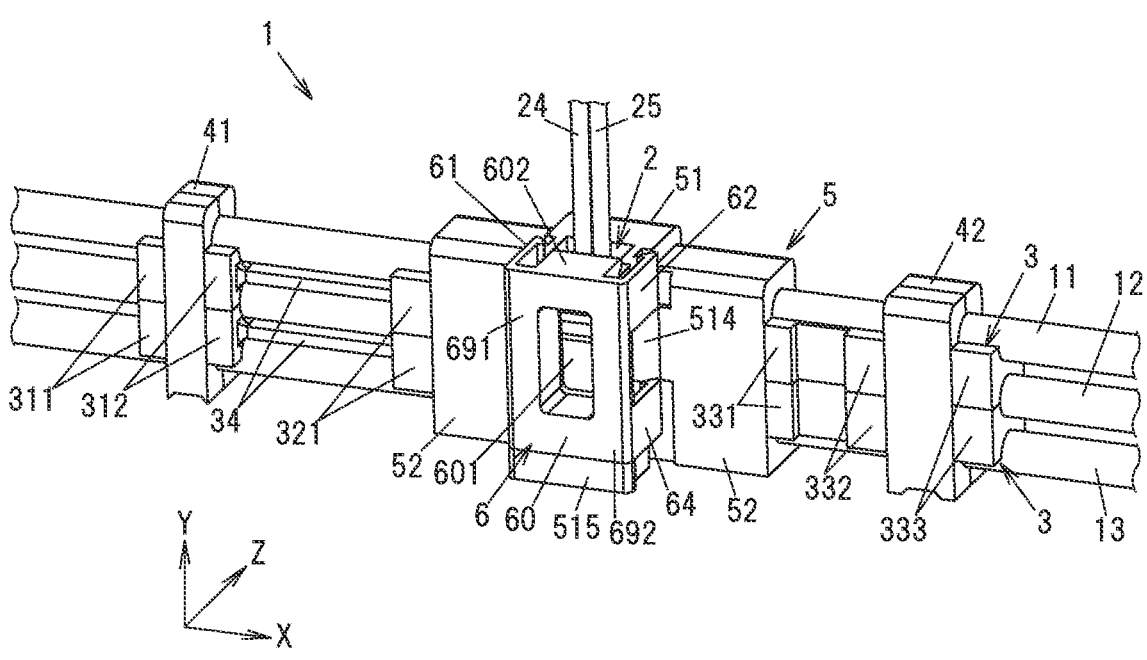
FIG. 1 is a perspective view showing a wiring component with physical quantity sensor in the first embodiment.

FIG. 1 is a perspective view showing a wiring component with physical quantity sensor in the first embodiment of the invention. This wiring component 1 with physical quantity sensor includes first to third electric wires 11 to 13, a physical quantity sensor 2 to detect a physical quantity of the first to third electric wires 11 to 13, two spacers 3, 3 arranged between the first to third electric wires 11 to 13, first and second fixing members 41, 42 to fix the two spacers 3, 3 to the first to third electric wires 11 to 13, a holding member 5 to hold the physical quantity sensor 2 relative to the first to third electric wires 11 to 13, and an attachment member 6 attached to the holding member 5.

Figure 2A:
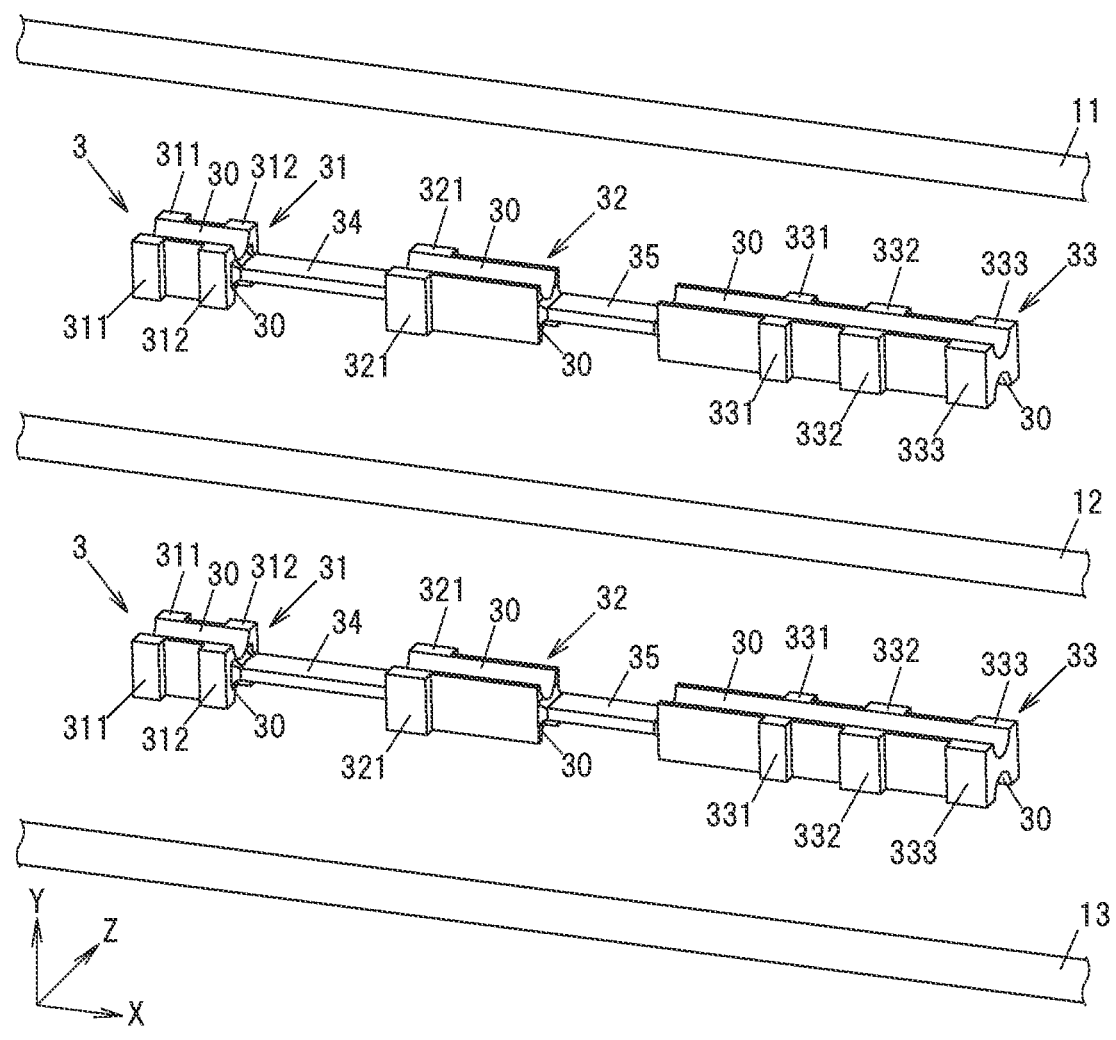
FIG. 2A is a perspective view showing first to third electric wires and spacers.
Figure 2B:
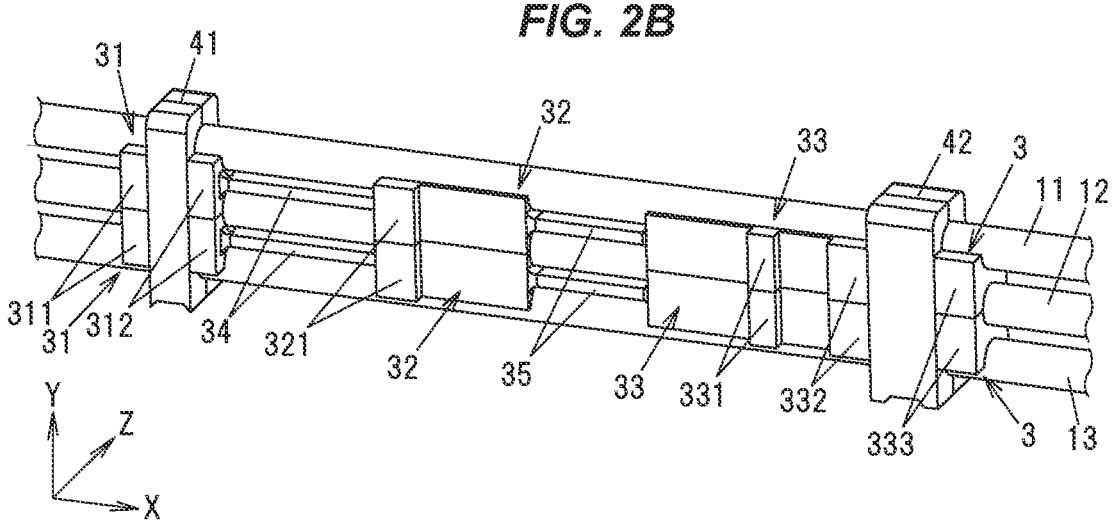
FIG. 2B is a perspective view showing a state in which the first to third electric wires and the spacers are combined.
Figure 3A:
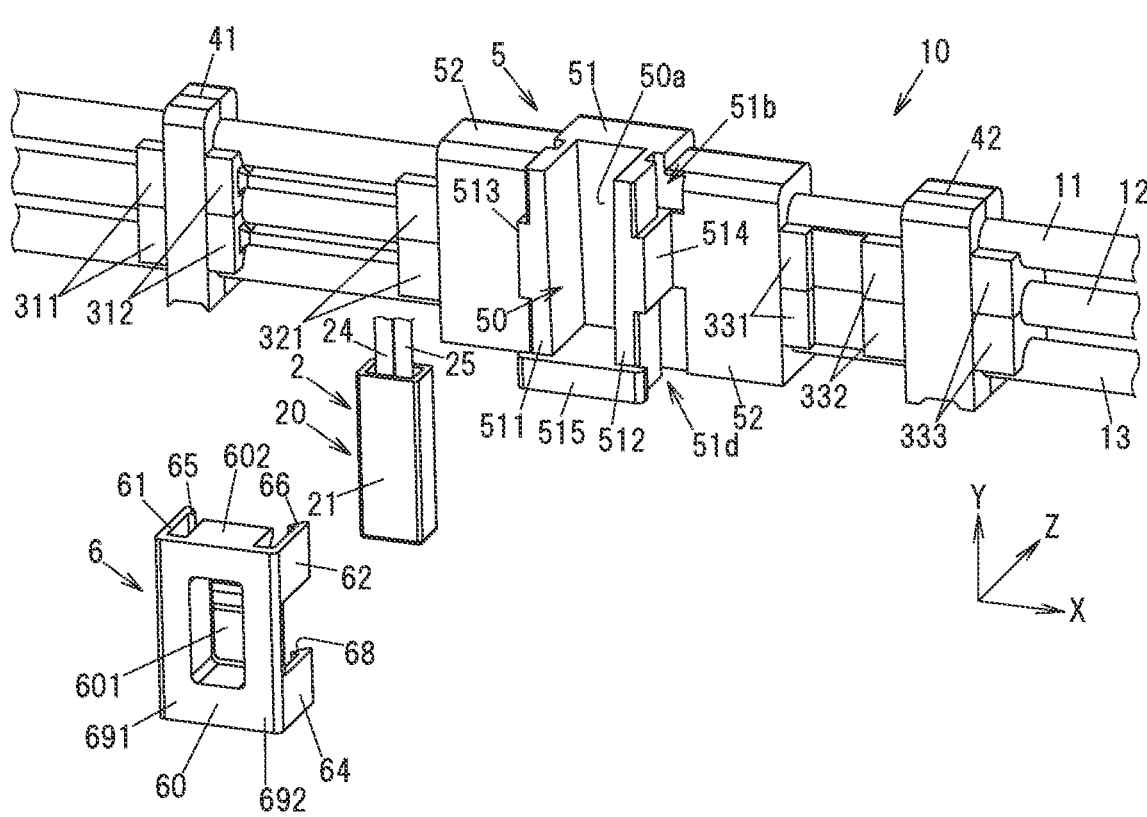
FIGS. 3A and 3B are perspective views showing an assembly of the first to third electric wires and the spacers integrated by fixing members and a holding member, a physical quantity sensor, and an attachment member.
Figure 3B:
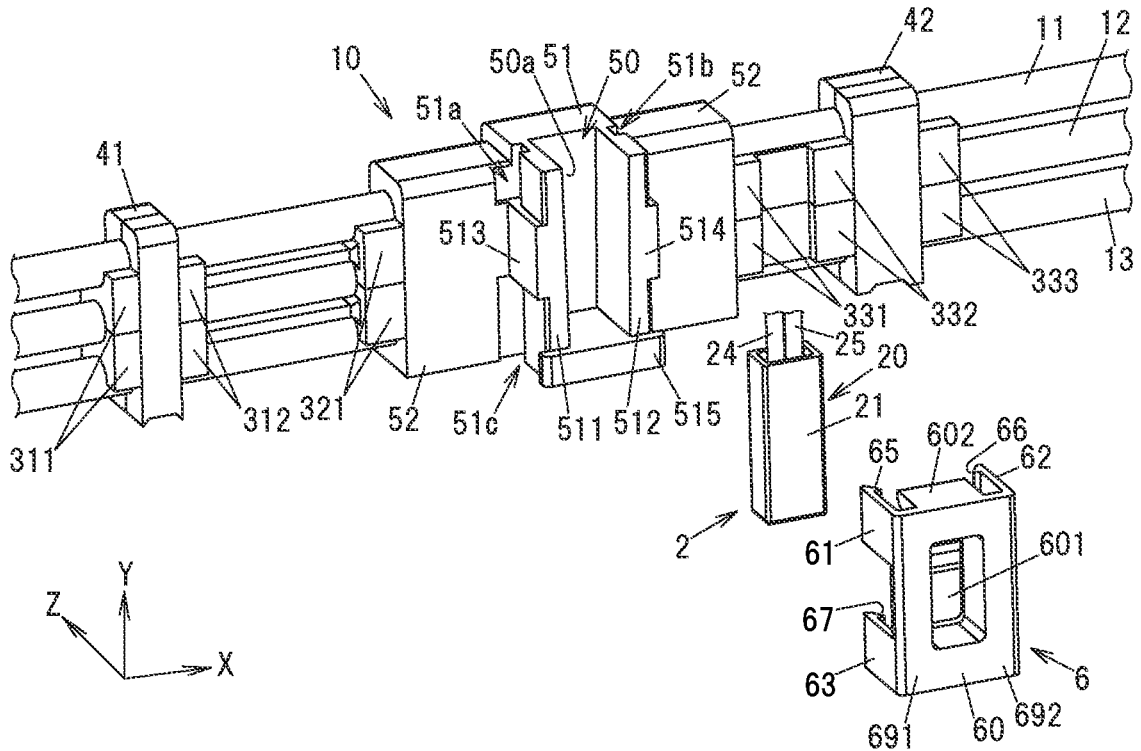
Figure 4A:
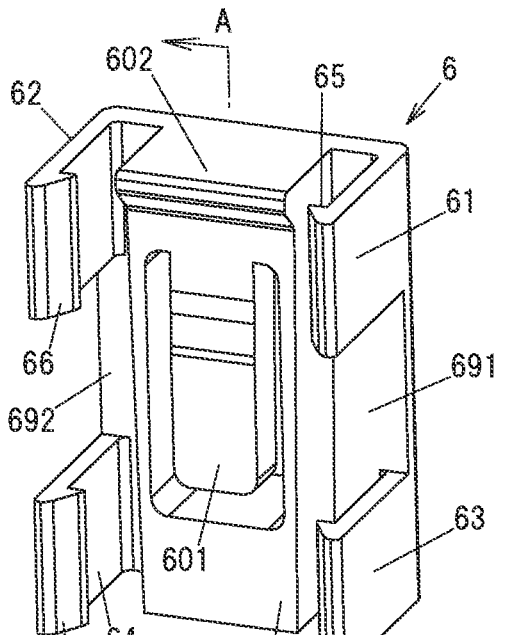
FIG. 4A is a perspective view showing the attachment member.
Figure 4B:
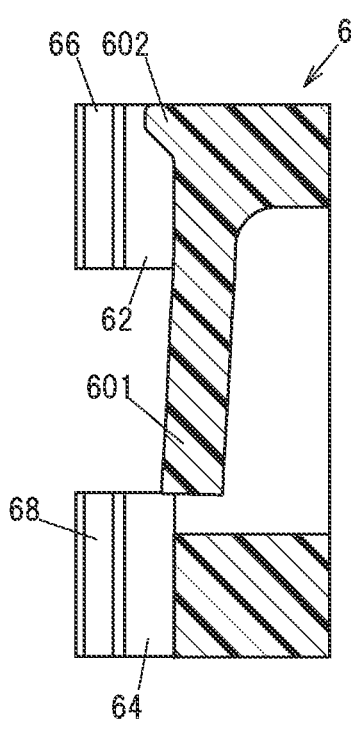
FIG. 4B is a cross-sectional view showing the attachment member taken along line A-A in FIG. 4A.
Figure 5:
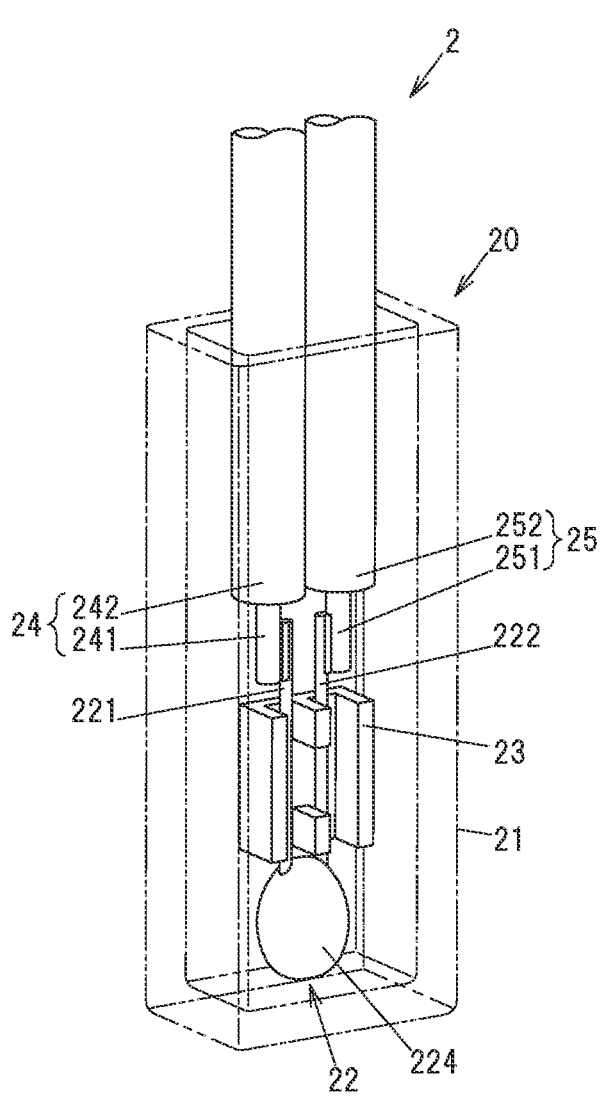
FIG. 5 is a diagram illustrating an internal structure of the physical quantity sensor.
Figures 6A, 6B:
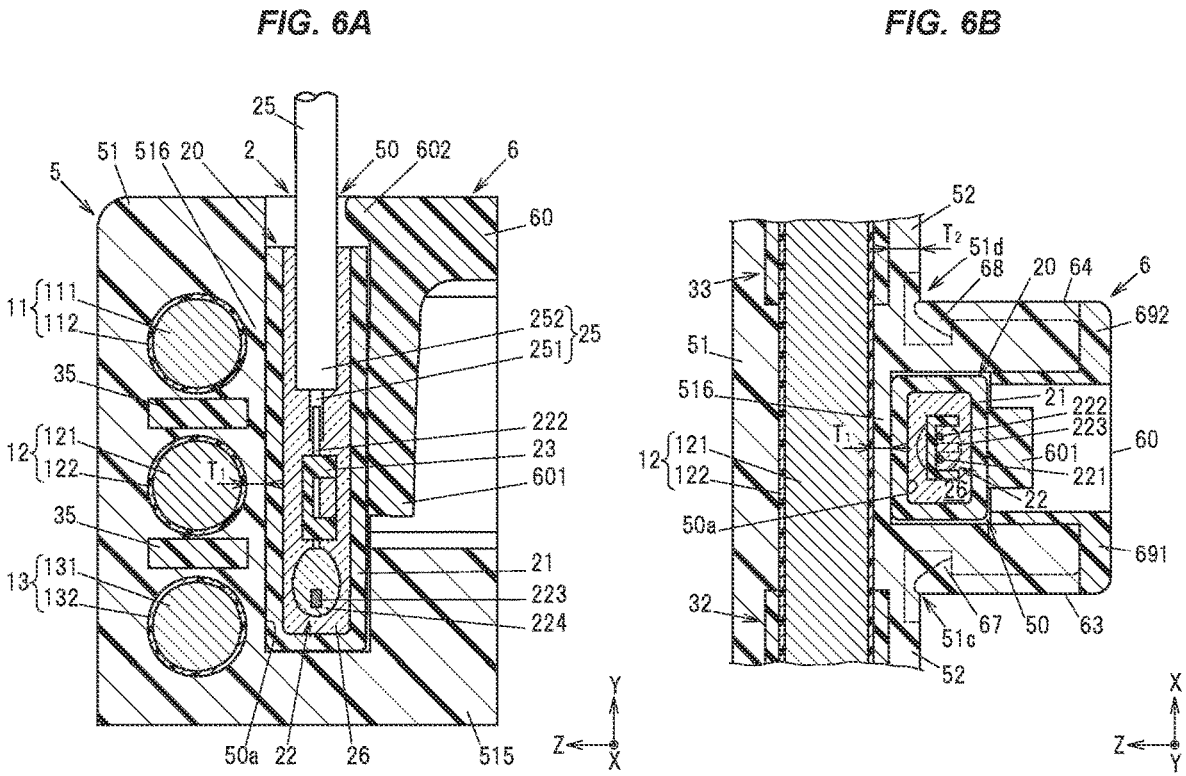
FIGS. 6A and 6B are cross-sectional views showing the wiring component with physical quantity sensor.

FIG. 2A is a perspective view showing the first to third electric wires 11 to 13 and the spacers 3, 3, and FIG. 2B is a perspective view showing a state in which the first to third electric wires 11 to 13 and the spacers 3, 3 are combined. FIGS. 3A and 3B are perspective views showing an assembly 10 of the first to third electric wires 11 to 13 and the spacers 3, 3 integrated by the fixing members 41, 42 and the holding member 5, the physical quantity sensor 2, and the attachment member 6. FIG. 4A is a perspective view showing the attachment member 6, and FIG. 413 is a cross-sectional view showing the attachment member 6 taken along line A-A in FIG. 4A. FIG. 5 is a diagram illustrating an internal structure of the physical quantity sensor 2. FIGS. 6A and 6B are cross-sectional views showing the wiring component 1 with physical quantity sensor.

In the first embodiment, the physical quantity sensor 2 will be described as a temperature sensor that detects temperature of the first to third electric wires 11 to 13 as a physical quantity. However, the present invention is not limited thereto and, e.g., strength of a magnetic field generated by a current flowing through the first to third electric wires 11 to 13 may be detected as a physical quantity.

As shown in FIG. 5, the physical quantity sensor 2 has a case member 21 made of a resin and formed into a rectangular parallelepiped shape, a thermistor 22 as a detection unit that converts a physical quantity (temperature in the first embodiment) into an electrical signal, a support member 23 that supports lead wires 221, 222 of the thermistor 22, a pair of signal wires 24, 25 respectively connected to the lead wires 221, 222, and a filler 26 (see FIGS. 6A and 6B) filling the inside of the case member 21. The filler 26 is, e.g., an epoxy resin. The case member 21, the thermistor 22, the support member 23 and the filler 26 constitutes a main body

20 of the physical quantity sensor 2. The case member 21 and the filler 26 which have relatively high thermal conductivity are used.

The pair of signal wires 24, 25 are insulated wires formed by covering core wires 241, 251, which are stranded wires, with insulations 242, 252 made of a resin, and transmit detection signals of the physical quantity sensor 2 to, e.g., a control device (not shown). The thermistor 22 has a sintered metal oxide 223 (see FIG. 6A) as a detection element whose electric resistance changes with temperature, and a sealing material 224 sealing the sintered metal oxide 223, and respective one ends of the lead wires 221, 222 are connected to both ends of the sintered metal oxide 223. The other ends of the lead wires 221, 222 are respectively connected to the core wires 241, 251 of the signal wires 24, 25 inside the case member 21.

The first to third electric wires 11 to 13 are respectively connected to three-phase windings of a rotating electrical machine. The rotating electrical machine is, e.g., a motor in which a rotor is rotated by a magnetic field generated in a stator by three-phase alternating current, or a generator (electrical generator) that generates three-phase alternating current by rotation of the rotor, or a motor-generator that has both the function of the motor and the function of the generator.

As shown in FIG. 6A, the first to third electric wires 11 to 13 are insulation-covered wires in which conductors 111, 121, 131 made of highly conductive metal such as copper are covered with cover layers 112, 122, 132 made of an insulating resin such as enamel. Although the first to third electric wires 11 to 13 in the first embodiment are round solid wires (i.e., round single wires) having a circular cross-sectional shape, it is not limited thereto. The first to third electric wires 11 to 13 may be, e.g., rectangular wires having a rectangular cross-section shape.

As shown in FIGS. 2A and 2B, the first to third electric wires 11 to 13 are aligned in parallel to each other with the two resin spacers 3, 3 therebetween. One spacer 3 is arranged between the first electric wire 11 and the second electric wire 12, and the other spacer 3 is arranged between the second electric wire 12 and the third electric wire 13. Hereinafter, a longitudinal direction of the first to third electric wires 11 to 13 is referred to as an X direction, an alignment direction of the first to third electric wires 11 to 13 is referred to as a Y direction, and a direction perpendicular to the X direction and the Y direction is referred to as a Z direction.

The spacer 3 is made of an injection-molded resin and integrally has first to third wire-supporting portions 31 to 33 on each of which recessed grooves 30 having a semi-circular cross section are formed to house any of the first to third electric wires 11 to 13, and first and second coupling portions 34, 35 which have a plate shape and couple the first to third wire-supporting portions 31 to 33 along the X direction. First and second anchor portions 311, 312 are provided on the first wire-supporting portion 31, and third anchor portions 321 are provided on the second wire-supporting portion 32. Fourth to sixth anchor portions 331 to 333 are provided on the third wire-supporting portion 33. The first to sixth anchor portions 311, 312, 321, 331, 332, 333 are protrusions provided on the first to third wire-supporting portions 31 to 33 sous to protrude from both sides in the Z direction.

The first fixing member 41 is provided between the first anchor portions 311 and the second anchor portions 312 and surrounds the first wire-supporting portions 31 of the spacers 3 and also the first to third electric wires 11 to 13. The second fixing member 42 is provided between the fifth anchor portions 332 and the sixth anchor portions 333 and surrounds the third wire-supporting portions 33 of the spacers 3 and also the first to third electric wires 11 to 13.

The holding member 5 is provided between the third anchor portions 321 and the fourth anchor portions 331. The holding member 5 is composed of a molded body made of a resin and formed by molding and covers longitudinal portions of the first to third electric wires 11 to 13 and also the spacers 3, 3. As shown in FIGS. 3A and 3B, the holding member 5 integrally has a main body 51 having a holding hole 50 to house the physical quantity sensor 2, and a pair of wire-supporting portions 52, 52 provided on the main body 51 on both sides in the X direction.

The first fixing member 41 is provided on one side of the holding member 5 in the X direction, and the second fixing member 42 is provided on the other side of the holding member 5 in the X direction. In the first embodiment, the first and second fixing members 41, 42 are composed of molded bodies that are molded at the same time as the holding member 5. In this regard, each of the first and second fixing members 41, 42 may be composed of a combination of plural resin members.

The attachment member 6 is made of an injection-molded resin and integrally has a facing portion 60 that faces the physical quantity sensor 2 in the Z direction so as to sandwich the physical quantity sensor 2 between itself and the first to third electric wires 11 to 13, first to fourth arm portions 61 to 64 extending in the Z direction toward the first to third electric wires 11 to 13, first to fourth engagement protrusions 65 to 68 provided at respective ends of the first to fourth arm portions 61 to 64, and first and second extension portions 691, 692 that extend from both sides of the facing portion 60 in the X direction. The first extension portion 691 connects the facing portion 60 to respective base ends of the first and third arm portions 61, 63. The second extension portion 692 connects the facing portion 60 to respective base ends of the second and fourth arm portions 62, 64.

The facing portion 60 has an elastically deformable tongue piece 601 that elastically presses the physical quantity sensor 2 against a pressed surface 50a that is an inner surface of the holding hole 50 of the holding member 5 on the first to third electric wires 11 to 13 side. The tongue piece 601 elastically deforms at the time of attaching the attachment member 6 to the holding member 5 and presses the case member 21 of the physical quantity sensor 2 in the Z direction by its restoring force. The pressed surface 50a is a flat surface perpendicular to the Z direction.

The facing portion 60 also has a locking protrusion 602 to lock the case member 21 of the physical quantity sensor 2 to prevent the physical quantity sensor 2 from coming out of the holding hole 50. The locking protrusion 602 is provided on the facing portion 60 at an end in the Y direction and faces, in the Z direction, portions of the pair of signal wires 24, 25 of the physical quantity sensor 2 which extend out of the case member 21. Movement of the physical quantity sensor 2 relative to the holding member 5 in a direction of separating away in the Z direction from the pressed surface 50a and movement of the physical quantity sensor 2 relative to the holding member 5 in a direction of slipping out of the holding hole 50 in the Y direction along the pressed surface 50a are restricted by the attachment member 6.

The attachment member 6 is made of a resin which has a lower hardness and is softer than the holding member 5. The holding member 5 is made of, e.g., a PPS (polyphenylene sulfide) resin which is reinforced by a reinforcing material such as glass fibers or inorganic filler, while the attachment member 6 is made of, e.g., a relatively soft PPS resin which is not reinforced by a reinforcing material or contains less reinforcing material than the holding member 5. Thus, at the time of attaching the attachment member 6 to the holding member 5, the first to fourth arm portions 61 to 64 and the tongue piece 601 elastically deform and occurrence of cracks or chips, etc., is thereby suppressed.

Plural engagement recesses 51a to 51d respectively engaging the first to fourth engagement protrusions 65 to 68 of the attachment member 6 are formed on the main body 51 of the holding member 5. The first to fourth arm portions 61 to 64 elastically deform, the first to fourth engagement protrusions 65 to 68 engage the engagement recesses 51a to 51d, and the attachment member 6 is thereby attached to the holding member 5. As shown in FIGS. 1, 3A and 3B, the first arm portion 61 and the second arm portion 62 are aligned in the X direction, and the third arm portion 63 and the fourth arm portion 64 are aligned in the X direction. Meanwhile, the first arm portion 61 and the third arm portion 63 are aligned in the Y direction, and the second arm portion 62 and the fourth arm portion 64 are aligned in the Y direction.

The main body 20 of the physical quantity sensor 2 is arranged between the first and third arm portions 61, 63 and the second and fourth arm portions 61, 64. The first to fourth engagement protrusions 65 to 68 protrude from the respective ends of the first to fourth arm portions 61 to 64 toward the main body 20 of the physical quantity sensor 2.

The main body 51 of the holding member 5 has first and second side wall portions 511, 512 aligned in the X direction, and the physical quantity sensor 2 is housed so as to be sandwiched between the first side wall portion 511 and the second side wall portion 512. An end of the first side wall portion 511 in the Z direction is located between the facing portion 60 and the first and third arm portions 61, 63 of the attachment member 6 and faces the first extension portion 691 of the attachment member 6 in the Z direction. An end of the second side wall portion 512 in the Z direction is located between the facing portion 60 and the second and fourth arm portions 62, 64 of the attachment member 6 and faces the second extension portion 692 of the attachment member 6 in the Z direction.

The main body 51 of the holding member 5 also has a first interposing portion 513 interposed between the first arm portion 61 and the third arm portion 63 of the attachment member 6, and a second interposing portion 514 interposed between the second arm portion 62 and the fourth arm portion 64. In the first embodiment, the first interposing portion 513 is provided on the first side wall portion 511 on the opposite side to the physical quantity sensor 2, and the second interposing portion 514 is provided on the second side wall portion 512 on the opposite side to the physical quantity sensor 2.

Movement of the attachment member 6 in the Y direction relative to the holding member 5 is restricted by the first and second interposing portions 513, 514. In more particular, the first arm portion 61 comes into contact with one end of the first interposing portion 513 in the Y direction, the second arm portion 62 comes into contact with one end of the second interposing portion 514 in the Y direction, and movement of the attachment member 6 relative to the holding member 5 toward one side in the Y direction (toward the lower side in the drawing) is thereby restricted. Likewise, the third arm portion 63 comes into contact with the other end of the first interposing portion 513 in the Y direction, the fourth arm portion 64 comes into contact with the other end of the second interposing portion 514 in the Y direction, and movement of the attachment member 6 relative to the holding member 5 toward the other side in the Y direction (toward the upper side in the drawing) is thereby restricted.

The main body 51 of the holding member 5 also has a bottom wall portion 515 at an end in the Y direction on the opposite side to an opening of the holding hole 50. The bottom wall portion 515 is formed to extend between the first side wall portion 511 and the second side wall portion 512 and restricts movement of the physical quantity sensor 2 in a direction opposite to the direction in which the locking protrusion 602 of the attachment member 6 prevents the physical quantity sensor 2 from coming out.

As shown in FIGS. 6A and 6B, a thin wall portion 516, which is formed thin to the extent that a molten resin can well spread at the time of molding, is provided between the first to third electric wires 11 to 13 and the pressed surface 50*a*. A thickness $T_1$ of the thinnest portion of the thin wall portion 516 in the Z direction is, e.g., not less than 0.5 mm and not more than 0.8 mm. This thickness $T_1$ is smaller than a thickness $T_2$ of the molded body in the Z direction at the wire-supporting portions 52, 52 of the holding member 5. In other words, the thickness $T_2$ of the molded body in the Z direction at the wire-supporting portions 52, 52 is larger than the thickness $T_1$ of the thinnest portion of the thin wall portion 516, and rigidity to hold the first to third electric wires 11 to 13 by the wire-supporting portions 52, 52 is enhanced.

In the first embodiment described above, the physical quantity sensor 2 is held in the holding hole 50 of the holding member 5 that has been pre-molded (i.e., a pre-molded holding member 5). Therefore, the physical quantity sensor 2 is not exposed to heat when molding the holding member 5 and damage on the physical quantity sensor 2 due to this heat can be prevented. In addition, the attachment member 6 can be easily attached to the holding member 5 by configuring so that the first to fourth engagement protrusions 65 to 68 provided at the ends of the first to fourth arm portions 61 to 64 engage the plural engagement recesses 51*a* to 51*d* of the holding member, and the attachment member 6 can be formed in a small size by configuring so that the main body 20 of the physical quantity sensor 2 is arranged between the first and third arm portions 61, 63 and the second and fourth arm portions 62, 64. Furthermore, since movement in the Y direction relative to the holding member 5 is restricted by the first and second interposing portions 513, 514 of the holding member 5, the holding member 5 can be formed in a small size.

Second Embodiment

Figure 7:
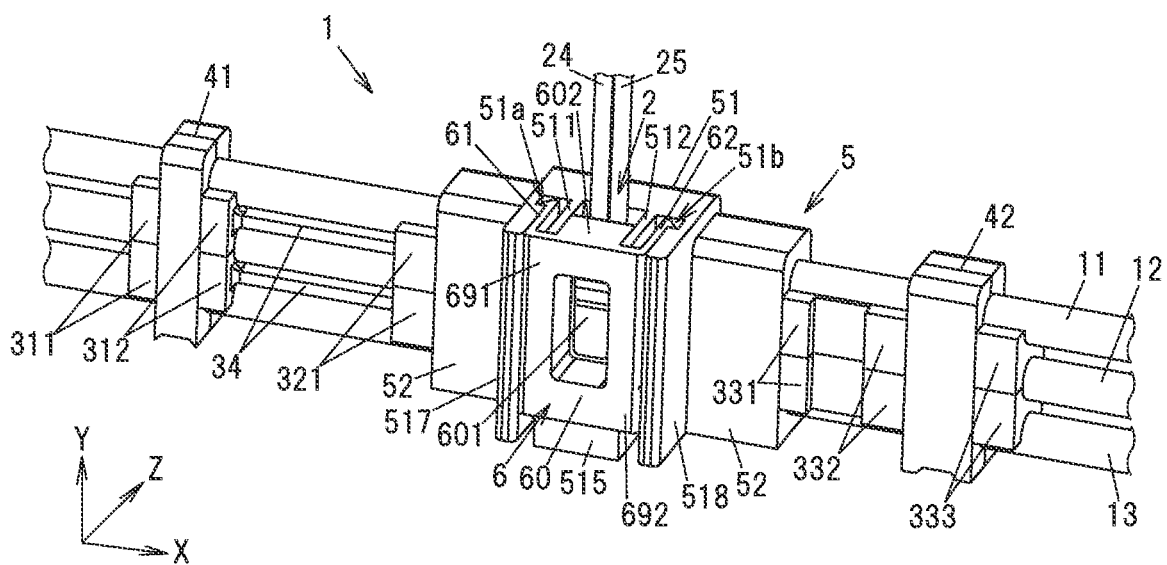
FIG. 7 is a perspective view showing the wiring component with physical quantity sensor in the second embodiment.
Figures 8A, 8B:
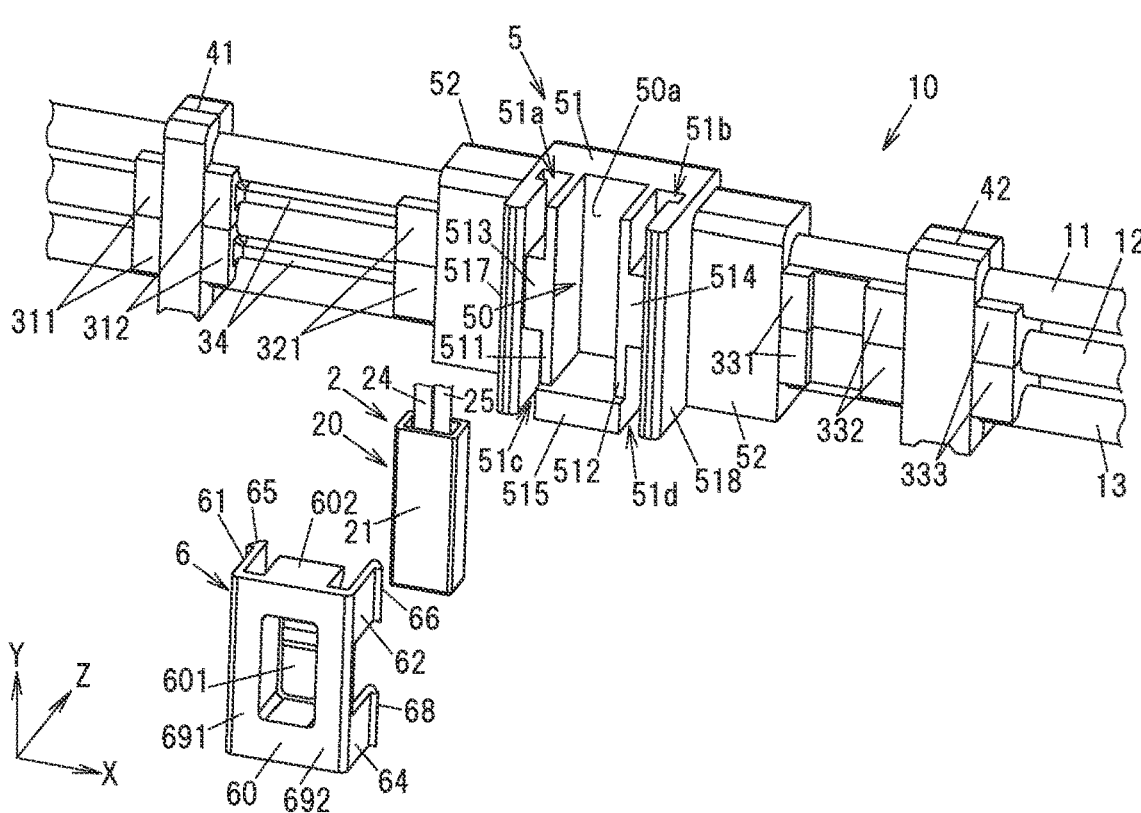
FIGS. 8A and 8B are perspective views showing the assembly, the physical quantity sensor and the attachment member in the second embodiment.
Figure 9A:
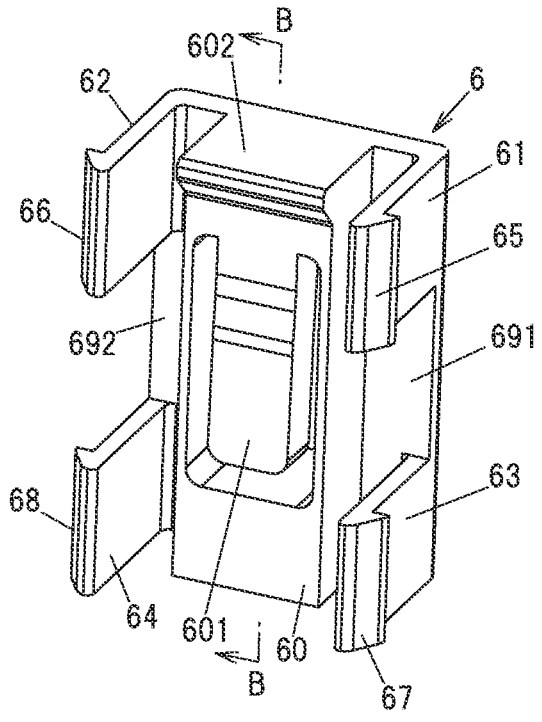
FIG. 9A is a perspective view showing the attachment member in the second embodiment.
Figure 9B:
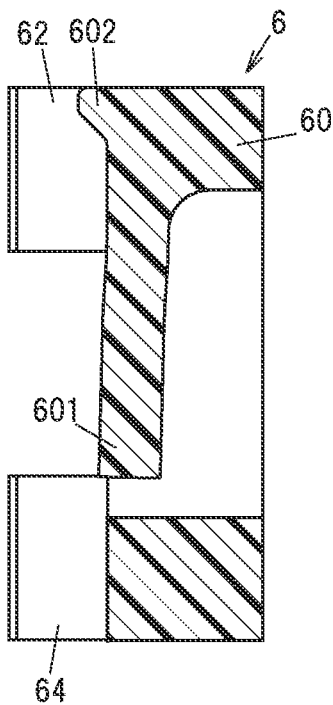
FIG. 9B is a cross-sectional view showing the attachment member taken along line B-B in FIG. 9A.

Next, the second embodiment of the invention will be described in reference to FIGS. 7 to 9. In FIGS. 7 to 9, constituent elements having the same functions as those described in the first embodiment are denoted by the same reference sings as those used in FIGS. 1 to 6, and overlapping explanation will be omitted. The same applies to the third to fifth embodiments described later.

In the first embodiment, the example in which the first to fourth engagement protrusions 65 to 68 of the attachment member 6 protrude from the respective ends of the first to fourth arm portions 61 to 64 toward the physical quantity sensor 2 has been described. In the second embodiment, the first to fourth engagement protrusions 65 to 68 protrude from the respective ends of the first to fourth arm portions 61 to 64 toward the side opposite to the physical quantity sensor 2. Therefore, in the second embodiment, the attachment member 6 can be molded using, e.g., a pair of upper and lower molds that move relative to each, other along an extending direction of the first to fourth arm portions 61 to 64 (the Z direction).

In addition, in the second embodiment, the holding member 5 includes a first outer wall portion 517 facing the first side wall portion 511 in the X direction and sandwiching the first and third arm portions 61, 63 between itself and the first side wall portion 511, and a second outer wall portion 518 facing the second side wall portion 512 in the X direction and sandwiching the second and fourth arm portions 62, 64 between itself and the second side wall portion 512.

In the second embodiment, the attachment member 6 can be molded at low cost, in addition to the same effects as the first embodiment.

Third Embodiment

Figure 10:
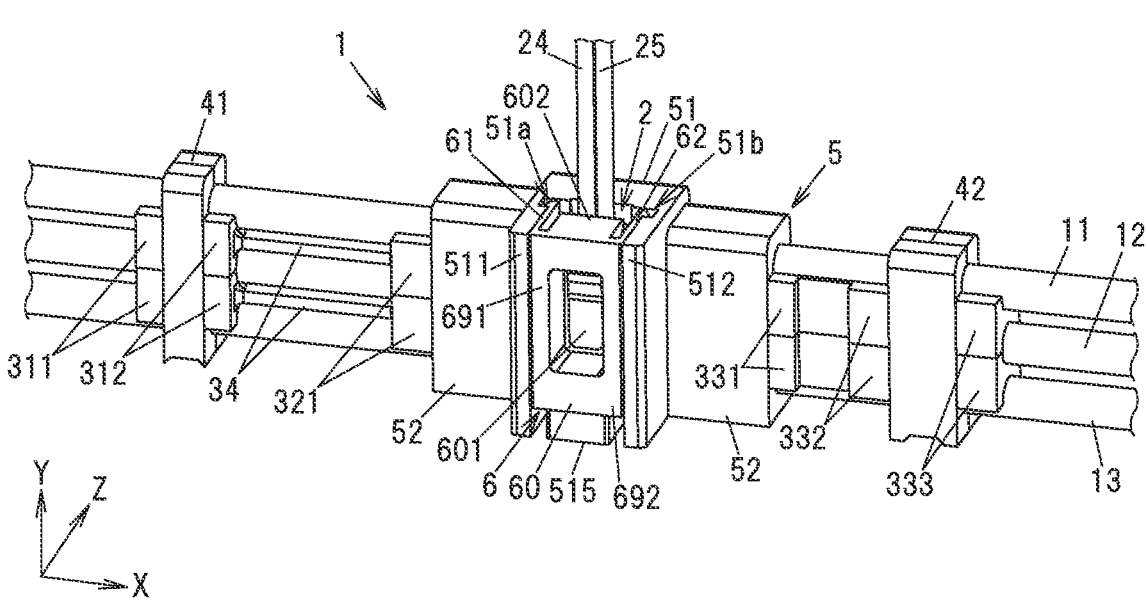
FIG. 10 is a perspective view showing the wiring component with physical quantity sensor in the third embodiment.
Figure 11A:
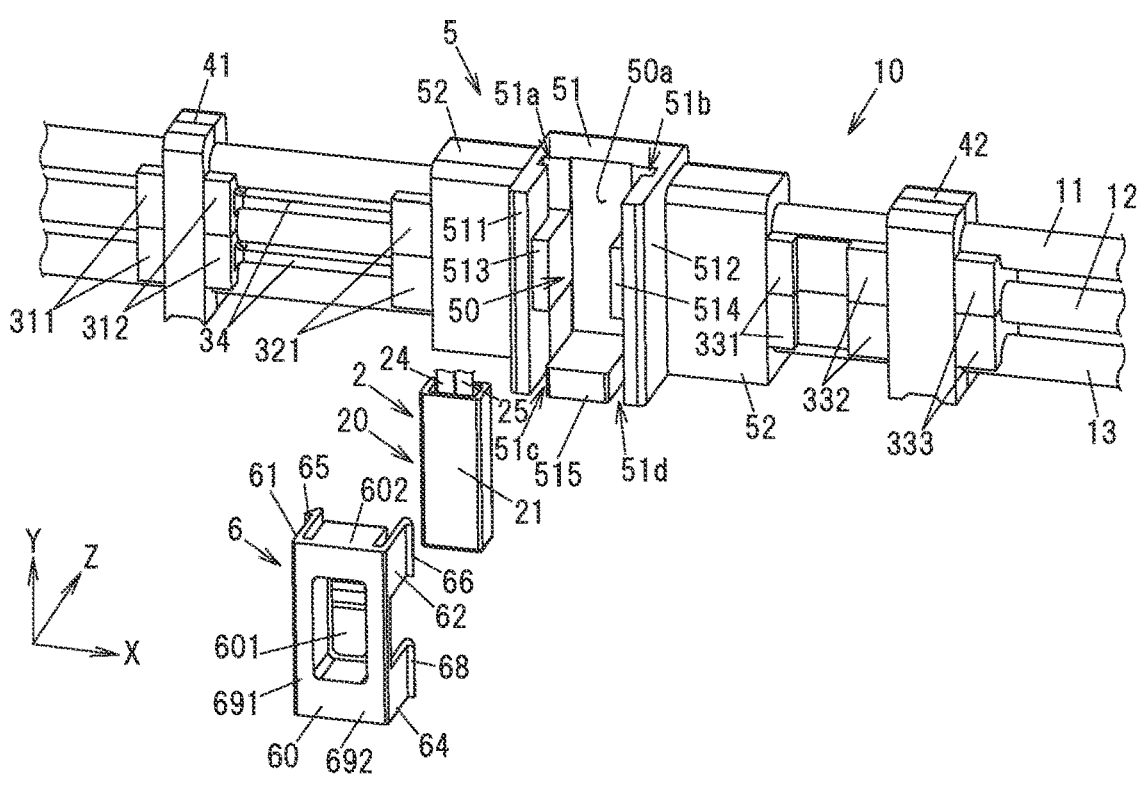
FIGS. 11A and 11B are perspective views showing the assembly, the physical quantity sensor and the attachment member in the third embodiment.
Figure 11B:
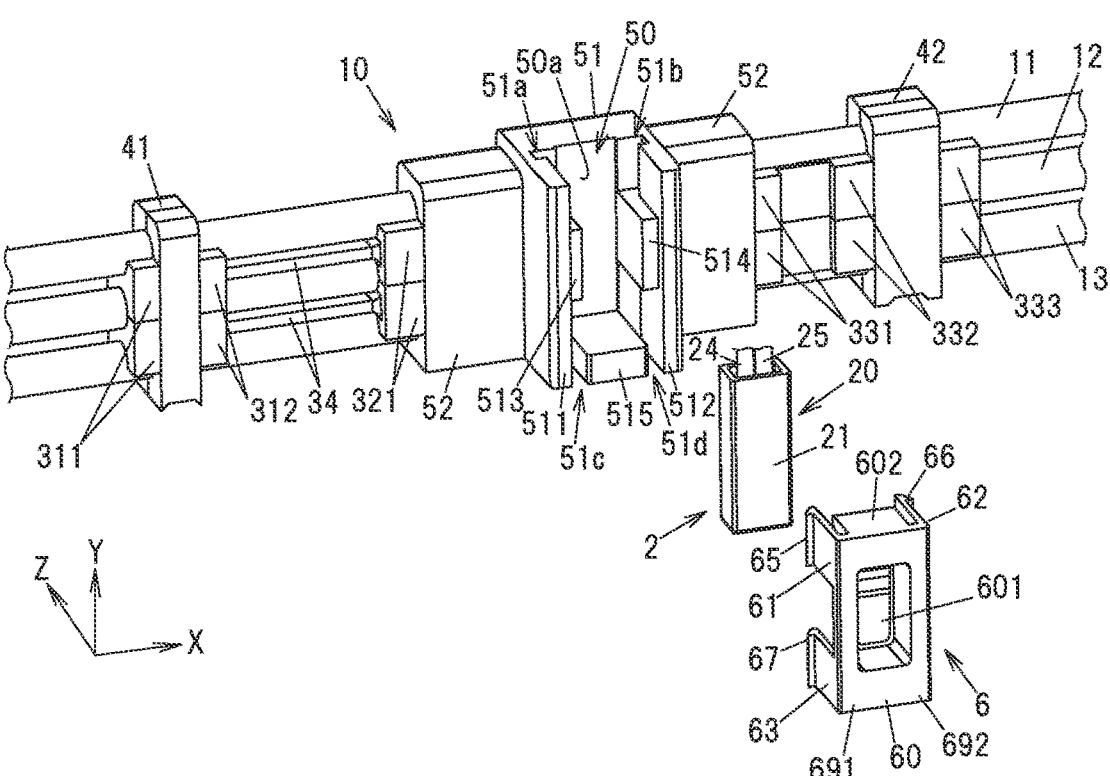
Figure 12A:
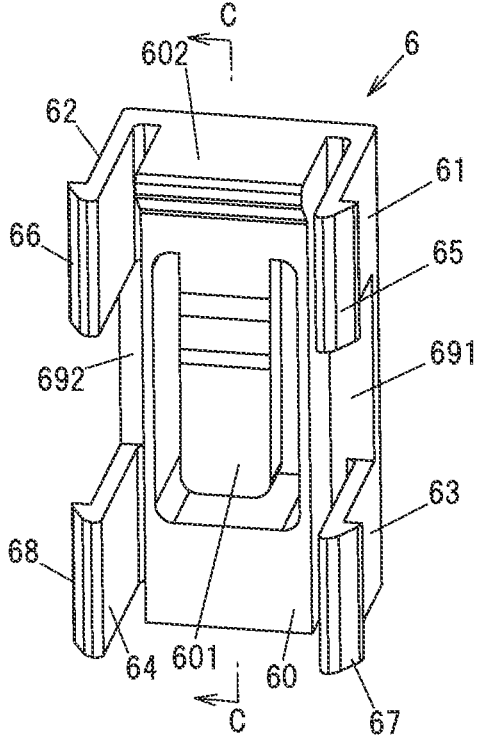
FIG. 12A is a perspective view showing the attachment member in the third embodiment.
Figure 12B:
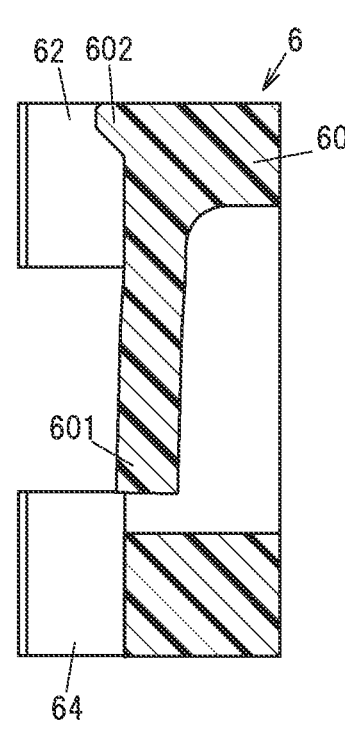
FIG. 12B is a cross-sectional view showing the attachment member taken along line C-C in FIG. 12A.

Next, the third embodiment of the invention will be described in reference to FIGS. 10 to 12. The third embodiment is an embodiment further modified from the second embodiment, and is configured in such a manner that the first to fourth engagement protrusions 65 to 68 protrude from the respective ends of the first to fourth arm portions 61 to 64 toward the side opposite to the physical quantity sensor 2, and the first and second interposing portions 513, 514 on the first and second side wall portions 511, 512 are provided on the physical quantity sensor 2 side. The first and second outer wall portions 517, 518 are not provide in the third embodiment.

Thus, in the third embodiment, the holding member 5 and the attachment member 6 can be reduced in size, in addition to the same effects as the second embodiment. In addition, as compared to the second embodiment, the volumes of the holding member 5 and the attachment member 6 can be reduced and heat of the first to third electric wires 11 to 13 is thus less likely to be diffused, allowing temperature detection accuracy of the physical quantity sensor 2 to be increased.

Fourth Embodiment

Figure 13A:
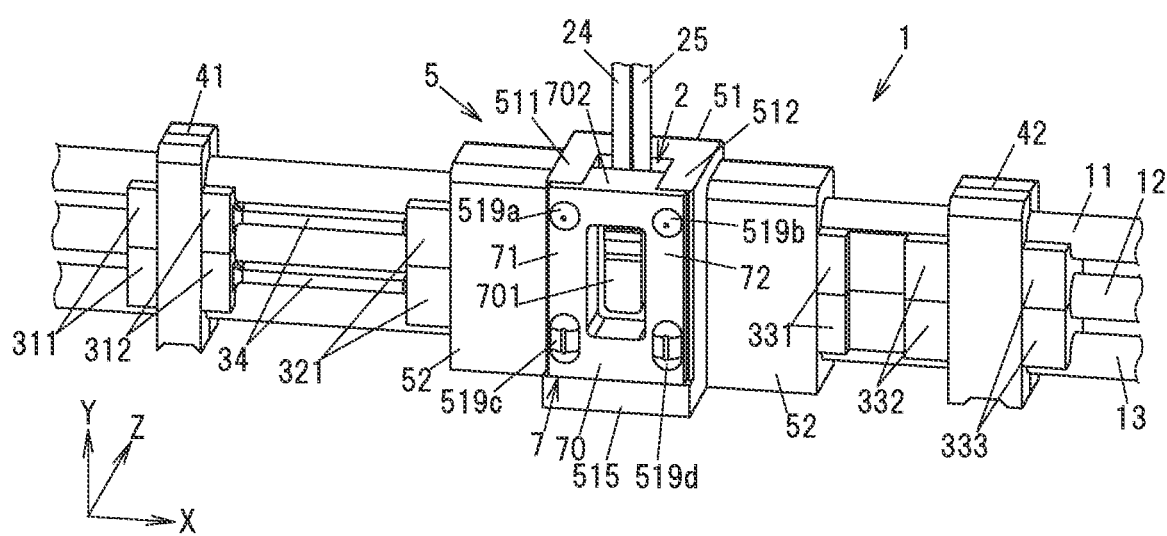
FIG. 13A is a perspective view showing the wiring component with physical quantity sensor in the fourth embodiment.
Figure 13B:
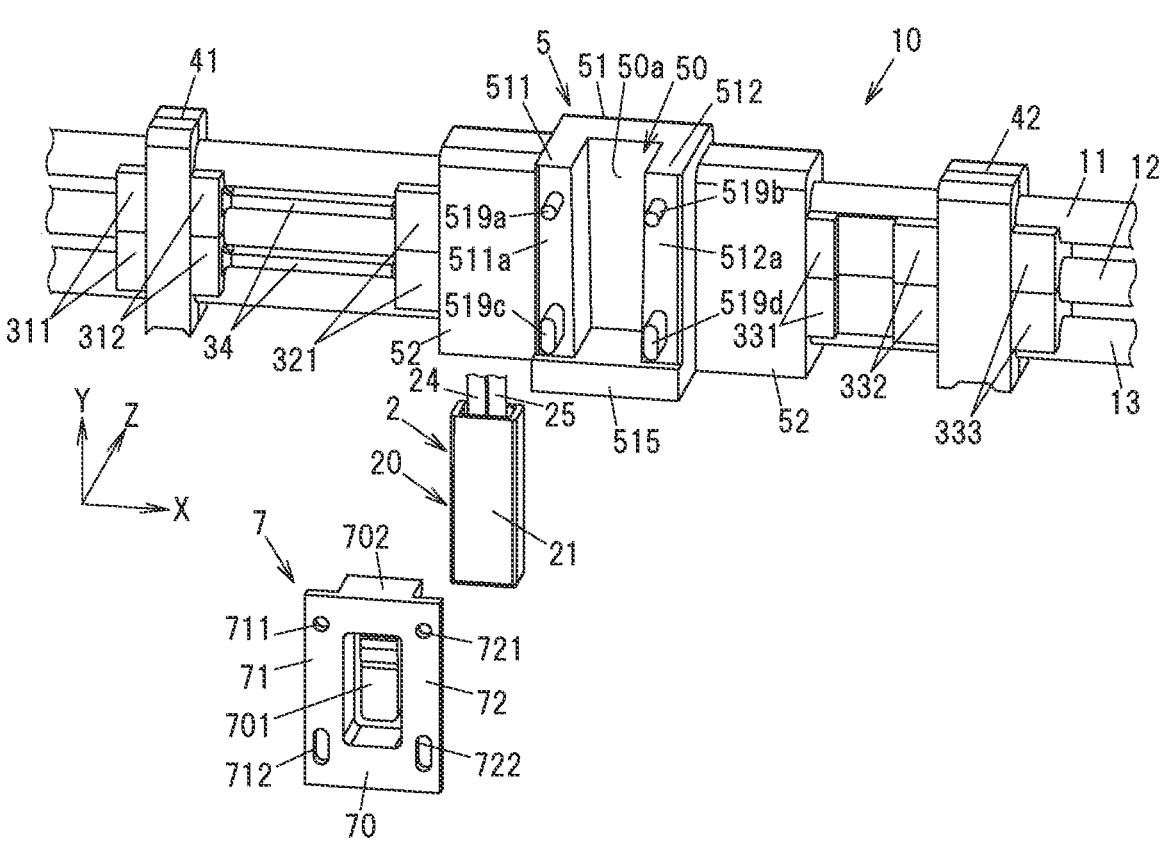
FIG. 13B is a perspective view showing the assembly, the physical quantity sensor and the attachment member in the fourth embodiment.
Figure 14A:
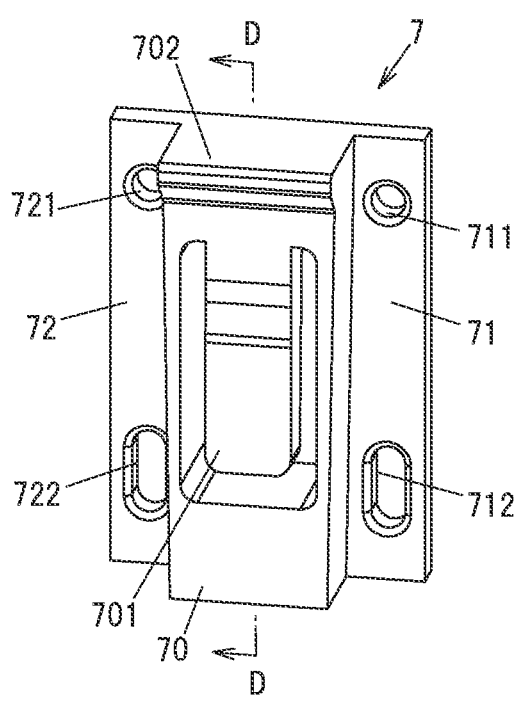
FIG. 14A is a perspective view showing the attachment member in the fourth embodiment.
Figure 14B:
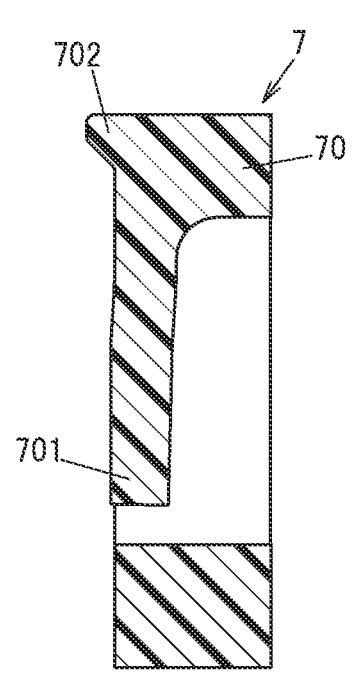
FIG. 14B is a cross-sectional view showing the attachment member taken along line D-D in FIG. 14A.

Next, the fourth embodiment of the invention will be described in reference to FIGS. 13 and 14. In the fourth embodiment, the main body 20 of the physical quantity sensor 2 housed in the holding hole 50 of the holding member 5 is prevented from coming out by an attachment member 7 which integrally has a facing portion 70 facing the physical quantity sensor 2 in the Z direction and first and second protruding pieces 71, 72 having a plate-shape and protruding from both sides of the facing portion 70 in the X direction. The facing portion 70 includes a tongue piece 701 elastically pressing the physical quantity sensor 2 against the pressed surface 50*a* of the holding member 5, and a locking protrusion 702 to lock the case member 21 of the physical quantity sensor 2 to prevent the physical quantity sensor 2 from coming out of the holding hole 50.

Raised portions provided on one of the holding member 5 and the attachment member 7 are fitted to recessed portions provided on the other, and the attachment member 7 is thereby attached to the holding member 5. FIGS. 13 and 14 show an example in which first to fourth raised portions 519*a* to 519*d* provided on the main body 51 of the holding member 5 are fitted to first to fourth recessed portions (e.g., recesses, holes, through-holes) 711, 721, 712, 722 provided on the attachment member 7. The first and third raised portions 519*a*, 519*c* are provided to rise upright from an end face 511*a* of the first side wall portion 511, and the second and fourth raised portions 519*b*, 519*d* are provided to rise upright from an end face 512*a* of the second side wall portion 512. As shown in FIG. 13B, the first and second raised portions 519*a*, 519*b* have a circular cross-sectional shape as an example, and the third and fourth raised portions 519*c*, 519*d* have an oval cross-sectional shape as an example.

The attachment member 7 is configured in such a manner that the first and third recessed portions 711, 712 are provided on the first protruding piece 71 and the second and fourth recessed portions 721, 722 are provided on the second protruding piece 72. The shapes of the first to fourth recessed portions 711, 721, 712, 722 correspond to the shapes of the first to fourth raised portions 519*a* to 519*d*. As shown in FIG. 13A, end portions of the first to fourth raised portions 519*a* to 519*d* inserted into the first to fourth recessed portions 711, 721, 712, 722 are deformed by heating and formed into an umbrella shape so that the first to fourth raised portions 519*a* to 519*d* do not come out of the first to fourth recessed portions 711, 721, 712, 722. In this regard, however, if the attachment member 7 can be attached to the holding member 5 with sufficient strength to prevent the attachment member 7 from detaching from the holding member 5 by, e.g., press-fitting the first to fourth raised portions 519*a* to 519*d* into the first to fourth recessed portions 711, 721, 712, 722, it is not necessary to deform the end portions of the first to fourth raised portions 519*a* to 519*d*.

Also in the fourth embodiment, it is possible to prevent damage on the physical quantity sensor 2 due to heat at the time of molding the holding member 5 in the same manner as the first embodiment.

Fifth Embodiment

Figure 15A:
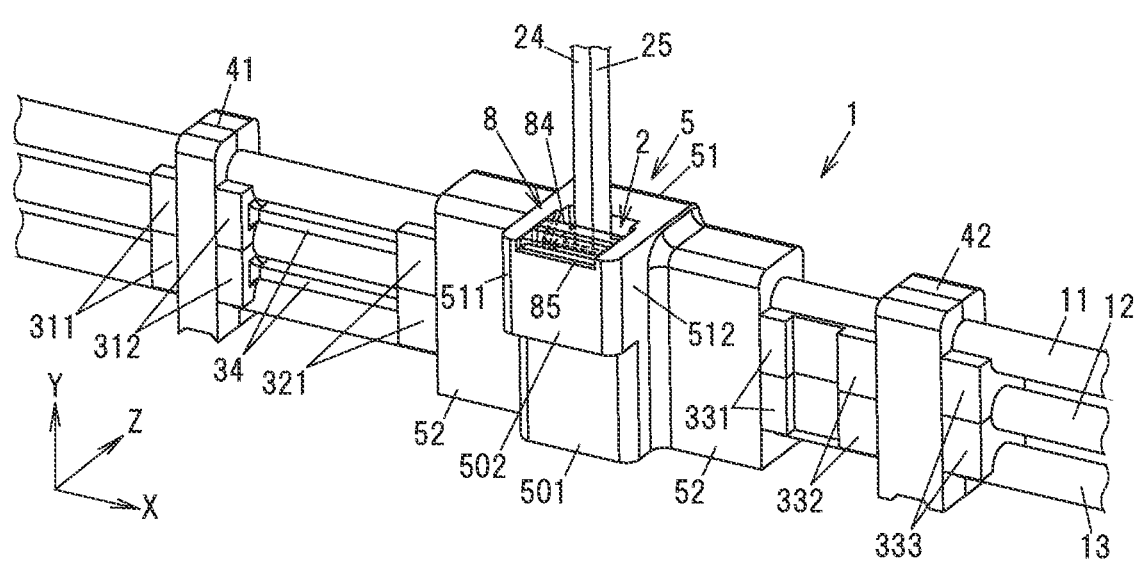
FIG. 15A is a perspective view showing the wiring component with physical quantity sensor in the fifth embodiment.
Figure 15B:
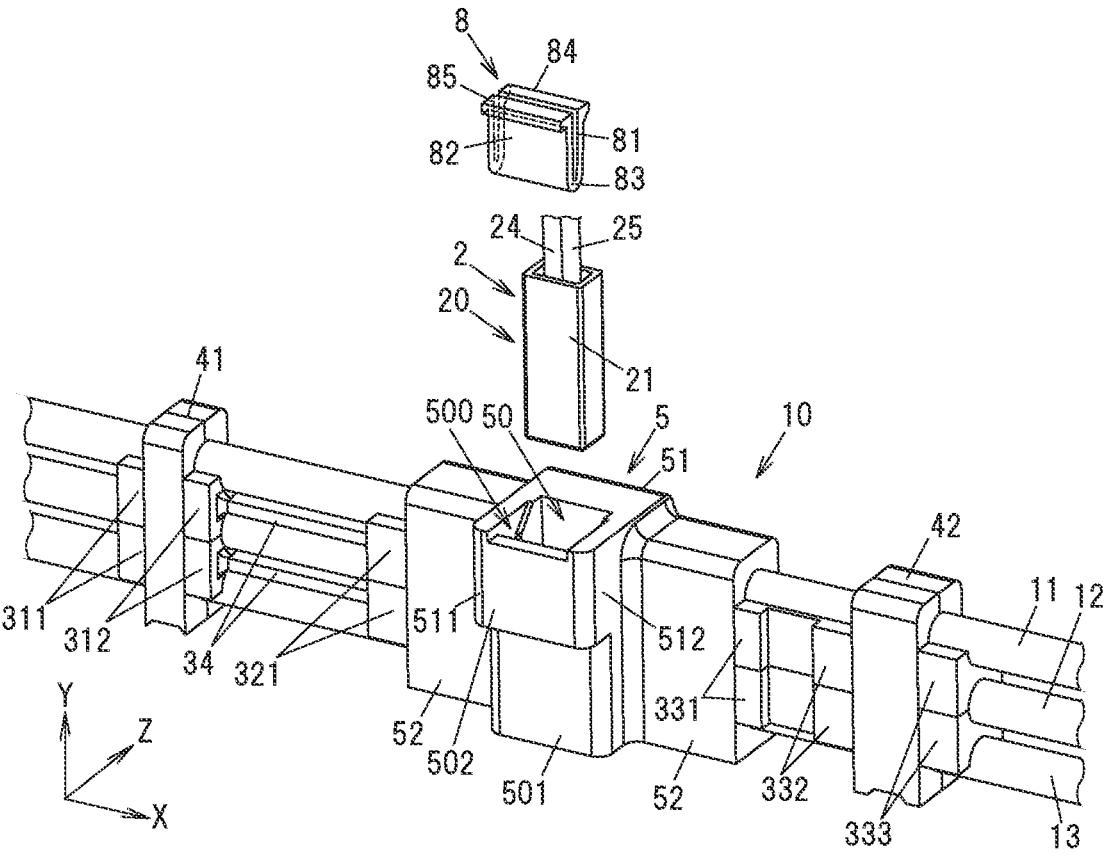
FIG. 15B is a perspective view showing the assembly, the physical quantity sensor and the attachment member in the fifth embodiment.
Figure 16:
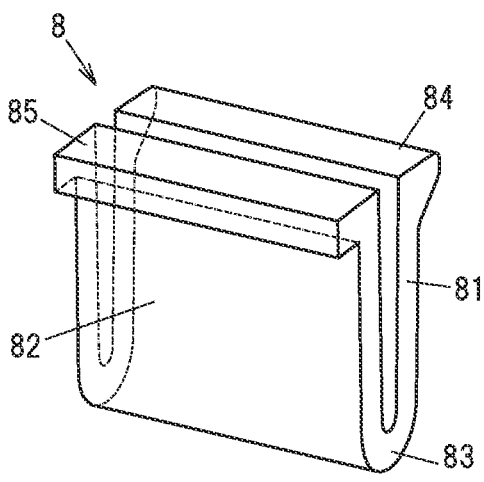
FIG. 16 is a perspective view showing the attachment member in the fifth embodiment.
Figure 17:
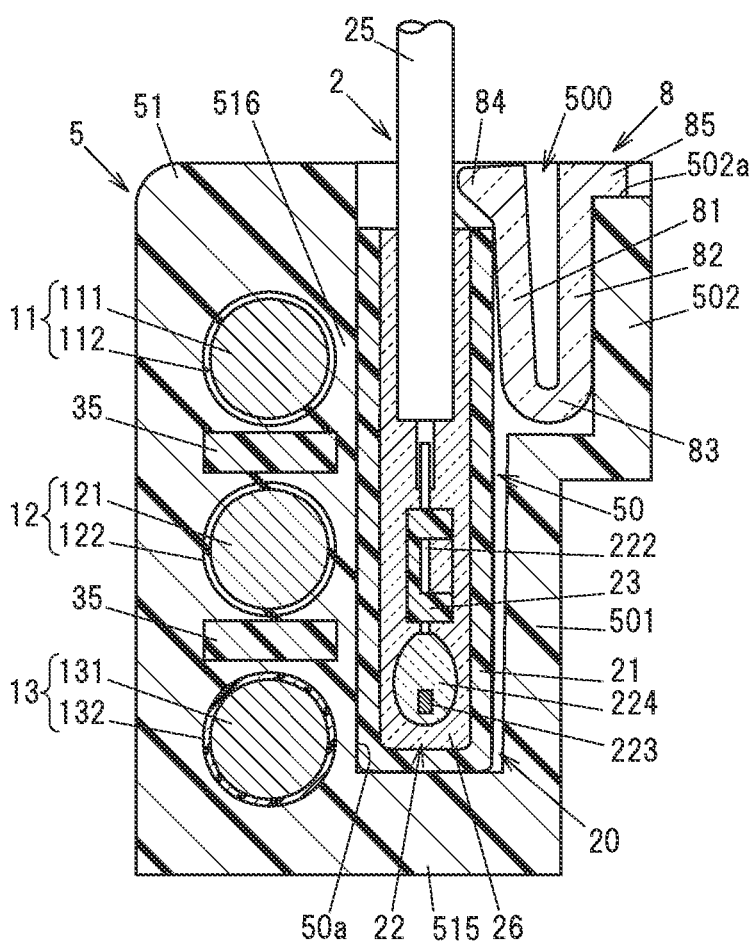
FIG. 17 is a cross-sectional view showing the wiring component with physical quantity sensor in the fifth embodiment.

Next, the fifth embodiment of the invention will be described in reference to FIGS. 15 to 17. In the fifth embodiment, an attachment member holding hole 500 is formed on the holding member 5 so as to be in communication with the holding hole 50, and an attachment member 8 is housed in the attachment member holding hole 500. The holding member 5 has a first holding wall 501 provided so that a portion of the main body 20 of the physical quantity sensor 2 is housed between the first holding wall 501 and the pressed surface 50*a* of the holding member 5, and a second holding wall 502 provided so that a portion of the main body 20 of the physical quantity sensor 2 and the attachment member 8 are housed between the second holding wall 502 and the pressed surface 50*a*.

The attachment member 8 has a U-shape when viewed in the X direction, and integrally has a first plate portion 81 elastically pressing the main body 20 of the physical quantity sensor 2 against the pressed surface 50*a*, a second plate portion 82 facing the first plate portion 81 in the Z direction with a gap therebetween, a connecting portion 83 connecting the first plate portion 81 to the second plate portion 82, a locking protrusion 84 provided at an end of the first plate portion 81 to prevent the physical quantity sensor 2 from coming out of the holding hole 50, and a locked protrusion 85 provided at an end of the second plate portion 82 and locked to an end face 502*a* of the second holding wall 502.

The attachment member 8 is housed in the attachment member holding hole 500 in a state of being elastically compressed in the Z direction so that the first plate portion 81 and the second plate portion 82 come close to each other between the case member 21 of the physical quantity sensor 2 and the second holding wall 502. The first plate portion 81 is elastically in contact with the case member 21 of the physical quantity sensor 2, and the second plate portion 82 is elastically in contact with the second holding wall 502. The main body 20 of the physical quantity sensor 2 is pressed against the pressed surface 50*a* by the first plate portion 81.

The attachment member 8 is fixed to the holding member 5 by, e.g., an adhesive. In this case, the attachment member 8 can be firmly fixed to the holding member 5 by using a transparent resin such as acrylic to form the attachment member 8, filling the attachment member holding hole 500 with a light-curing adhesive, and curing the adhesive under exposure to light.

Also in the fifth embodiment, it is possible to prevent damage on the physical quantity sensor 2 due to heat at the time of molding the holding member 5 in the same manner as the first embodiment.

Modification of the Fifth Embodiment

Figure 18:
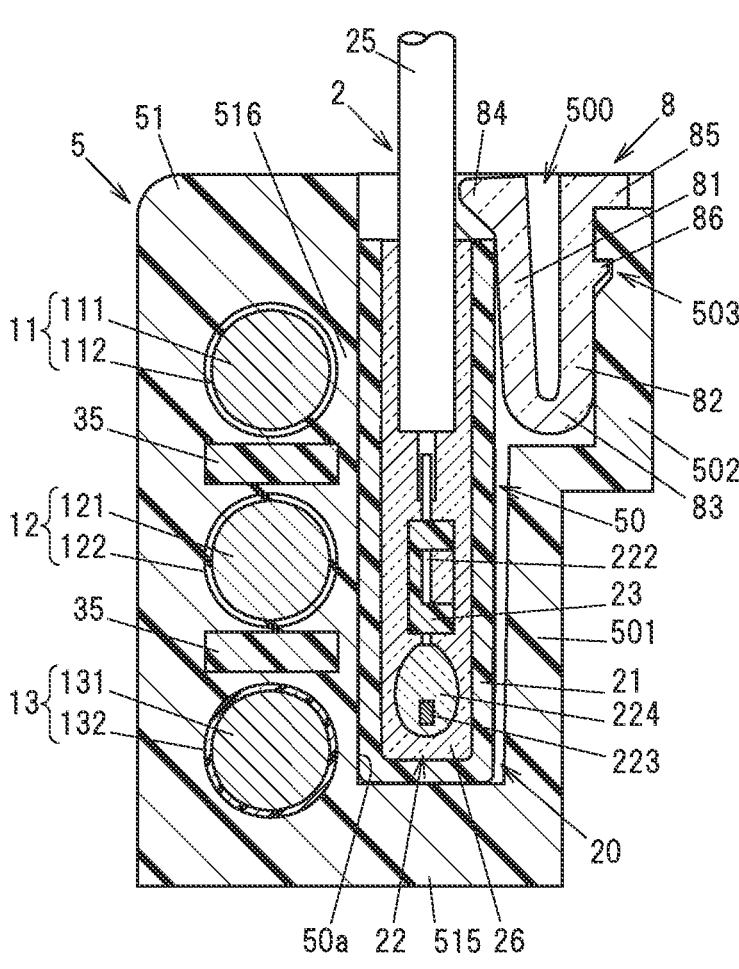
FIG. 18 is a cross-sectional view showing the wiring component with physical quantity sensor in a modification of the fifth embodiment.

FIG. 18 is a cross-sectional view showing a modification of the fifth embodiment. In this modification, an engagement portion 86 to prevent the attachment member 8 from coming out of the attachment member holding hole 500 is provided on the second plate portion 82, and an engaged portion 503 engaged with the engagement portion 86 is provided on the second holding wall 502. This configuration can prevent the attachment member 8 from coming out of the attachment member holding hole 500 without using the adhesive.

Summary of the Embodiments

Technical ideas understood from the embodiments will be described below citing the reference signs, etc., used for the embodiments. However, each reference sign described below is not intended to limit the constituent elements in the claims to the members, etc., specifically described in the embodiments.

According to the feature [1], a wiring component 1 with a physical quantity sensor, includes: an electric wire (or electric wires) 11 to 13; a physical quantity sensor 2 to detect a physical quantity of the electric wire 11 to 13; a holding member 5 that includes a molded body covering a portion in a longitudinal direction of the electric wire 11 to 13 and has a holding hole 50 to house the physical quantity sensor 2; and an attachment member 6 attached to the holding member 5, wherein the physical quantity sensor 2 is prevented from coming out of the holding hole 50 by the attachment member 6.

According to the feature [2], in the wiring component 1 with physical quantity sensor as described in the feature [1], the attachment member 6 includes a facing portion 60 facing the physical quantity sensor 2 so as to sandwich the physical quantity sensor 2 between the facing portion 60 and the electric wire 11 to 13, a plurality of arm portions 61 to 64 extending toward the electric wire 11 to 13, and a plurality of engagement protrusions 65 to 68 provided at respective ends of the plurality of arm portions 61 to 64, and a plurality of engagement recesses 51*a* to 51*d* respectively engaging the plurality of engagement protrusions 65 to 68 of the attachment member 6 are formed on the holding member 5.

According to the feature [3], in the wiring component 1 with physical quantity sensor as described in the feature [2], the physical quantity sensor 2 is arranged between some 61, 63 of the plurality of arm portions 61 to 64 of the attachment member 6 and the other arm portions 62, 64, and the plurality of engagement protrusions 65 to 68 protrude from the respective ends of the plurality of arm portions 61 to 64 toward a side opposite to the physical quantity sensor 2.

According to the feature [4], in the wiring component 1 with physical quantity sensor as described in the feature [2] or [3], the holding member 5 includes an interposing portion. 513, 514 interposed between a pair of arm portions 61, 63; 62, 64 aligned in a predetermined direction. Y direction among the plurality of arm portions 61 to 64 of the attachment member 6, and movement of the attachment member 6 in the predetermined direction Y direction relative to the holding member 5 is restricted by the interposing portion 513, 514.

According to the feature [5], in the wiring component 1 with physical quantity sensor as described in the feature [4], the holding member 5 includes a pair of side wall portions 511, 512 aligned in a direction X direction perpendicular to the predetermined direction Y direction and the physical quantity sensor 2 is housed between the pair of side wall portions 511, 512, and wherein the interposing portion 513, 514 is provided on each of the pair of side wall portions 511, 512 on the physical quantity sensor 2 side.

According to the feature [6], in the wiring component 1 with physical quantity sensor as described in the feature [4], the holding member 5 includes a pair of side wall portions 511, 512 aligned in a direction X direction perpendicular to the predetermined direction Y direction and the physical quantity sensor 2 is housed between the pair of side wall portions 511, 512, and the interposing portion 513, 514 is provided on each of the pair of side wall portions 511, 512 on a side opposite to the physical quantity sensor 2.

According to the feature [7], in the wiring component 1 with physical quantity sensor as described in the feature [1], the attachment member 7 is attached to the holding member 5 by fitting a raised portion first to fourth raised portions 519a to 519d, which is provided on one of the holding member 5 and the attachment member 7, to a recessed portion first to fourth recessed portions 711, 721, 712, 722 provided on the other of the holding member 5 and the attachment member 7.

According to the feature [8], in the wiring component 1 with physical quantity sensor as described in the feature [1], an attachment member holding hole 500 is formed on the holding member 5 so as to be in communication with the holding hole 50, and wherein the attachment member 8 is housed in the attachment member holding hole 500.

According to the feature [9], in the wiring component 1 with physical quantity sensor as described in the feature any one of [1] to [8], the attachment member 7 elastically presses the physical quantity sensor 2 against a pressed surface 50a that includes an inner surface of the holding hole 50 on the electric wire 11 to 13 side.

Although the embodiments of the invention have been described, the invention according to claims is not to be limited to the embodiments described above. Further, please note that not all combinations of the features described in the embodiments are necessary to solve the problem of the invention. In addition, the invention can be appropriately modified and implemented without departing from the gist thereof and can be modified and implemented, e.g., as follows.

Although the example in which the first to third electric wires 11 to 13 are subjected to detection of the physical quantity has been described in each embodiment, only one electric wire may be subjected to detection of the physical quantity. In this case, it may be configured to hold only one electric wire by the holding member. In addition, also the configuration of the physical quantity sensor 2 is not limited to the example shown in FIG. 5.

The invention claimed is:

1. A wiring component with physical quantity sensor, comprising:
   an electric wire;
   a physical quantity sensor to detect a physical quantity of the electric wire;
   a holding member that comprises a molded body covering a portion in a longitudinal direction of the electric wire and has a holding hole to house the physical quantity sensor; and
   an attachment member attached to the holding member, wherein the physical quantity sensor is prevented from coming out of the holding hole by the attachment member,
   wherein the attachment member comprises a facing portion facing the physical quantity sensor so as to sandwich the physical quantity sensor between the facing portion and the electric wire and a plurality of arm portions extending toward the electric wire,
   wherein the holding member comprises an interposing portion interposed between a pair of arm portions aligned in a predetermined direction parallel to an axis of the electric wire among the plurality of arm portions, and movement of the attachment member in the predetermined direction relative to the holding member is restricted by the interposing portion,
   wherein the attachment member further comprises a plurality of engagement protrusions provided at respective ends of the plurality of arm portions, and
   wherein a plurality of engagement recesses respectively engaging the plurality of engagement protrusions of the attachment member are formed on the holding member, and
   wherein, when the holding member is viewed from an attaching direction of the attachment member, the plurality of engagement recesses are disposed so as to sandwich the interposing portion of the holding member.

2. The wiring component with physical quantity sensor according to claim 1,
   wherein the physical quantity sensor is arranged between some of the plurality of arm portions of the attachment member and other arm portions, and
   wherein the plurality of engagement protrusions protrude from respective ends of the plurality of arm portions toward a side opposite to the physical quantity sensor.

3. The wiring component with physical quantity sensor according to claim 1,
   wherein the holding member comprises a pair of side wall portions aligned in a direction perpendicular to the predetermined direction and the physical quantity sensor is housed between the pair of side wall portions, and
   wherein the interposing portion is provided on each of the pair of side wall portions on the physical quantity sensor side.

4. The wiring component with physical quantity sensor according to claim 1,
   wherein the holding member comprises a pair of side wall portions aligned in a direction perpendicular to the predetermined direction and the physical quantity sensor is housed between the pair of side wall portions, and
   wherein the interposing portion is provided on each of the pair of side wall portions on a side opposite to the physical quantity sensor.

5. The wiring component with physical quantity sensor according to claim 1, wherein the attachment member is attached to the holding member by fitting a raised portion, which is provided on one of the holding member and the attachment member, to a recessed portion provided on an other of the holding member and the attachment member.

6. The wiring component with physical quantity sensor according to claim 1, wherein an attachment member holding hole is formed on the holding member so as to be in communication with the holding hole, and wherein the attachment member is housed in the attachment member holding hole.

7. The wiring component with physical quantity sensor according to claim 1, wherein the attachment member elastically presses the physical quantity sensor against a pressed surface that comprises an inner surface of the holding hole on the electric wire side.

8. The wiring component with physical quantity sensor according to claim 1, wherein the pair of arm portions comprises two pairs of arm portions, each pair being aligned in a predetermined direction parallel to an axis of the electric wire among the plurality of arm portions.

9. The wiring component with physical quantity sensor according to claim 1, wherein the pair of arm portions comprises two pairs of arm portions and the interposing portion comprises two interposing portions, wherein each of the two interposing portions is interposed between each of the two pairs of arm portions.

10. The wiring component with physical quantity sensor according to claim 1, wherein the holding member includes a pair of opposing interposing portions aligned in a predetermined direction parallel to the axis of the electric wire.

11. The wiring component with physical quantity sensor according to claim 10, wherein one of the pair of arm portions is located on one side of the pair of interposing portions, and the other of the pair of arm portions is located on the other side of the interposing portions.

12. The wiring component with physical quantity sensor according to claim 1, wherein the attachment member is attached to the holding member by pressing it into the holding member in a direction orthogonal to the axis of the electric wire.

13. The wiring component with physical quantity sensor according to claim 1, wherein the attachment member at least substantially covers the physical quantity sensor when attached to the holding member.

14. The wiring component with physical quantity sensor according to claim 1, wherein the attachment member completely covers the physical quantity sensor when attached to the holding member.

15. The wiring component with physical quantity sensor according to claim 1, wherein movement of the attachment member in the attachment direction is arrested when the engagement protrusions are received in the engagement recesses.

* * * * *